United States Patent
Chiu et al.

(10) Patent No.: US 12,528,209 B2
(45) Date of Patent: Jan. 20, 2026

(54) SMART CASSETTE AND CALIBRATION METHOD FOR ROBOTIC ARM

(71) Applicant: United Microelectronics Corp., Hsinchu (TW)

(72) Inventors: Chin-Hsin Chiu, Tainan (TW); Jui-Hung Lee, Kaohsiung (TW); Chih-Chung Kuo, Tainan (TW); Chia-Jung Chang, Tainan (TW); Yung-Chien Kung, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 80 days.

(21) Appl. No.: 18/779,127

(22) Filed: Jul. 22, 2024

(65) Prior Publication Data

US 2025/0387929 A1 Dec. 25, 2025

(30) Foreign Application Priority Data

Jun. 19, 2024 (TW) ................. 113122651

(51) Int. Cl.
*B25J 9/16* (2006.01)
*B25J 19/02* (2006.01)

(52) U.S. Cl.
CPC ........... *B25J 19/022* (2013.01); *B25J 9/1692* (2013.01)

(58) Field of Classification Search
None
See application file for complete search history.

(56) References Cited

U.S. PATENT DOCUMENTS

| | | | |
|---|---|---|---|
| 6,388,436 B1 | 5/2002 | Nodot et al. | |
| 6,502,054 B1 * | 12/2002 | Mooring | G05B 19/4083 702/149 |
| 6,591,161 B2 * | 7/2003 | Yoo | H01L 21/67796 414/800 |

(Continued)

FOREIGN PATENT DOCUMENTS

| | | |
|---|---|---|
| CN | 205984923 U | 2/2017 |
| TW | 481883 B | 4/2015 |

OTHER PUBLICATIONS

Lee et al., Wafer positioning by laser scanning method, 2011, IEEE, p. 1833-1837 (Year: 2011).*

(Continued)

*Primary Examiner* — McDieunel Marc
(74) *Attorney, Agent, or Firm* — WPAT, PC

(57) ABSTRACT

A smart cassette and a calibration method for a robotic arm are provided. The smart cassette includes a carrier, a first vertical sensor, a second vertical sensor, a battery and a processor. The first vertical sensor is disposed on a first inner side of the carrier to obtain a plurality of first sensing values. The second vertical sensor is disposed on a second inner side of the carrier to obtain a plurality of second sensing values. The processor analyzes the first sensing values to obtain a first maximum sensing value and a first minimum sensing value, and analyzes the second sensing values to obtain a second maximum sensing value and a second minimum sensing value. The first maximum sensing value, the first minimum sensing value, the second maximum sensing value and the second minimum sensing value are sent to a server to provide a correction command.

13 Claims, 3 Drawing Sheets

(56) References Cited

U.S. PATENT DOCUMENTS

| | | | | |
|---|---|---|---|---|
| 7,085,622 B2* | 8/2006 | Sadighi | ............... | H01L 21/681 |
| | | | | 348/94 |
| 11,623,339 B1* | 4/2023 | Dietz | ................... | B25J 9/0084 |
| | | | | 700/245 |
| 11,912,513 B1* | 2/2024 | Polido | ................... | B25J 9/1697 |
| 12,446,905 B2* | 10/2025 | Cannata | ............... | A61B 34/30 |
| 2005/0203664 A1 | 9/2005 | Schauer et al. | | |
| 2025/0050124 A1* | 2/2025 | Vaidya | ................. | A61N 2/006 |

OTHER PUBLICATIONS

Adam et al., Amplitude modulated optical range data analysis in mobile robotics, 1993, IEEE, p. 8-13 (Year: 1993).*
Huang et al., New wafer prealigner based on multi-sensor fusion, 2008, IEEE, p. 3455-3458 (Year: 2008).*
Lee et al., Rotating IR Sensor System for 2.5D Sensing, 2006, IEEE, p. 814-819 (Year: 2006).*
Office Action issued by Taiwan Intellectual Property Office on Jan. 6, 2025.

* cited by examiner

SMART CASSETTE AND CALIBRATION METHOD FOR ROBOTIC ARM

This application claims the benefit of Taiwan application Serial No. 113122651, filed Jun. 19, 2024, the disclosure of which is incorporated by reference herein in its entirety.

TECHNICAL FIELD

The disclosure relates in general to a semiconductor process tool and a calibration method thereof, and more particularly to a smart cassette and a calibration method for a robotic arm.

BACKGROUND

In current practice, the calibration of the robot arm and the cassette is mostly done manually. Therefore, large errors often occur due to visual angle and personal judgment factors. During the process of placing the wafer by the robot arm, the position of the wafer may shift, causing the wafer to be scratched or cracked.

Therefore, how to correct the robot arm more accurately and reduce the visual angle error caused by human factors is actually the direction of research and development in the industry.

SUMMARY

The disclosure is directed to a smart cassette and a calibration method for a robotic arm. During the process of placing the sample wafer on the smart cassette, the robot arm is continuously measured through the vertical sensor to determine whether the robot arm is offset, and thereby correct the position of the robot arm to avoid positioning deviation of the robot arm. The wafer may be damaged or cracked due to movement.

According to one embodiment, a smart cassette is provided. The smart cassette includes a carrier, a first vertical sensor, a second vertical sensor, a battery and a processor. The first vertical sensor is disposed on a first inner side of the carrier. When a robot arm places a sample wafer into the carrier, the first vertical sensor emits a plurality of first lasers to a bottom surface of the sample wafer, and receives a plurality of first reflected lights reflected from the bottom surface to obtain a plurality of first sensing values. The second vertical sensor is disposed on a second inner side of the carrier. When the robot arm places the sample wafer into the carrier, the second vertical sensor emits a plurality of second lasers to the bottom surface of the sample wafer, and receives a plurality of second reflected lights reflected from the bottom surface to obtain a plurality of second sensing values. The battery is connected to the first vertical sensor and the second vertical sensor, for providing a power to the first vertical sensor and the second vertical sensor. The processor is connected to the first vertical sensor and the second vertical sensor. After obtaining the first sensing values and the second sensing values, the processor analyzes extreme values of the first sensing values to obtain a first maximum sensing value and a first minimum sensing value, and analyzes extreme values of the second sensing values to obtain a second maximum sensing value and a second minimum sensing value. The first maximum sensing value, the first minimum sensing value, the second maximum sensing value and the second minimum sensing value are sent to a server to provide a correction command.

According to another embodiment, a calibration method for a robot arm is provided. The calibration method for the robot arm includes the following steps: placing, by the robot arm, a sample wafer into a carrier of a smart cassette; emitting, by a first vertical sensor, a plurality of first lasers to a bottom surface of the sample wafer when the robot arm places the sample wafer into the carrier; emitting, by a second vertical sensor, a plurality of second lasers to the bottom surface of the sample wafer when the robot arm places the sample wafer into the carrier; receiving a plurality of first reflected lights reflected from the bottom surface to obtain a plurality of first sensing values; receiving a plurality of second reflected lights reflected from the bottom surface to obtain a plurality of first sensing values; analyzing extreme values of the first sensing values to obtain a first maximum sensing value and a first minimum sensing value; analyzing extreme values of the second sensing values to obtain a second maximum sensing value and a second minimum sensing value; and providing a correction command according to the first maximum sensing value, the first minimum sensing value, the second maximum sensing value and the second minimum sensing value.

Figure 1:
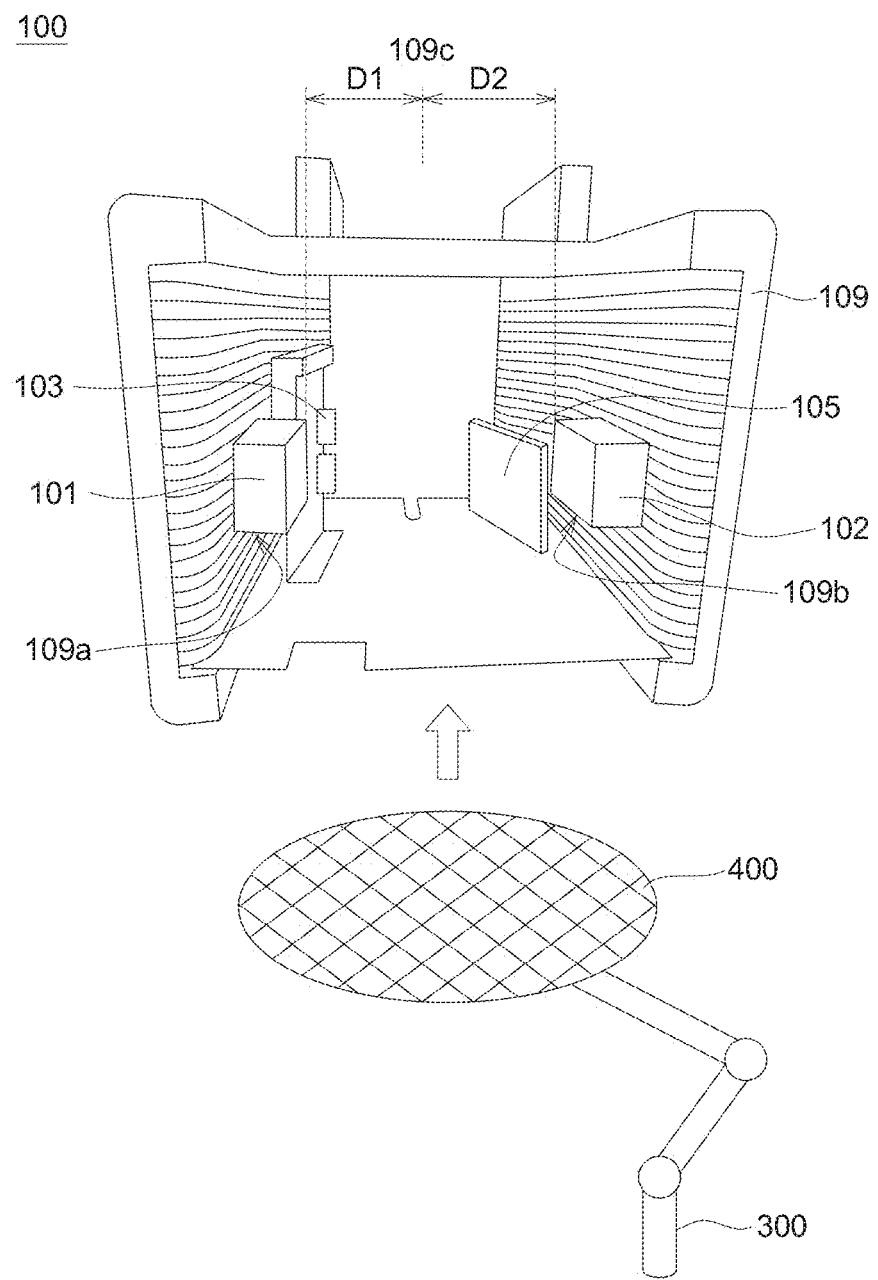
FIG. 1 illustrates a schematic diagram of a smart cassette and a robot arm according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates a schematic diagram of a smart cassette 100 and a robot arm 300 according to an embodiment of the present disclosure. The smart cassette 100 includes a carrier 109, a first vertical sensor 101, a second vertical sensor 102, a battery 105 and a processor 103. The first vertical sensor 101 is disposed on a first inner side 109a of the carrier 109. The second vertical sensor 102 is disposed on a second inner side 109b of the carrier 109. The first vertical sensor 101 and the second vertical sensor 102 sense by infrared line or laser, for example.

Figure 2:
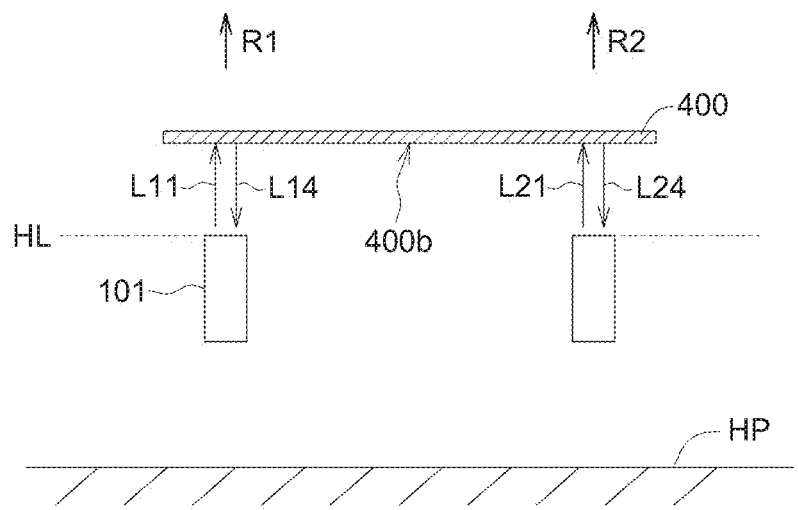
FIG. 2 illustrates the relationship among a first vertical sensor, a second vertical sensor and a sample wafer sample wafer according to an embodiment of the present disclosure.

Please refer to FIG. 2, which illustrates the relationship among the first vertical sensor 101, the second vertical sensor 102 and the sample wafer sample wafer 400 according to an embodiment of the present disclosure. The first vertical sensor 101 emits a plurality of first lasers L11 to a bottom surface 400b of the sample wafer 400, and receives a plurality of first reflected lights L14 reflected from the bottom surface 400b. The second vertical sensor 102 emits a plurality of second lasers L21 to the bottom surface 400b of the sample wafer 400, and receives a plurality of second reflected lights L24 reflected from the bottom surface 400b.

Please refer to FIG. 2. An emission direction R1 of the first lasers L11 is substantially perpendicular to a horizontal plane HP, and an emission direction R2 of the second lasers L21 is substantially perpendicular to the horizontal plane. The first vertical sensor 101 and the second vertical sensor 102 are substantially located at the same height HL.

Please refer to FIG. 1 again. The distance D1 between the first vertical sensor 101 and the center 109c of the carrier 109 is substantially equal to the distance D2 between the second vertical sensor 102 and the center 109c of the carrier 109.

Please refer to FIG. 1 again, the processor 103 is connected to the first vertical sensor 101 and the second vertical sensor 102. The processor 103 is, for example, a circuit, a circuit board, a storage device that stores program code, or a chip. The chip is, for example, a central processing unit (CPU), a programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), an embedded system, a field programmable gate array (FPGA), other similar element or a combination thereof.

The battery 105 is connected to the first vertical sensor 101 and the second vertical sensor 102 to provide a power PW to the first vertical sensor 101 and the second vertical sensor 102. The battery 105 is, for example, a lithium ion battery, a lithium polymer battery, a nickel metal hydride battery, or a nickel cadmium battery. The robot arm 300 is used to carry the sample wafer 400 and place the sample wafer 400 into the carrier 109.

Figure 3:
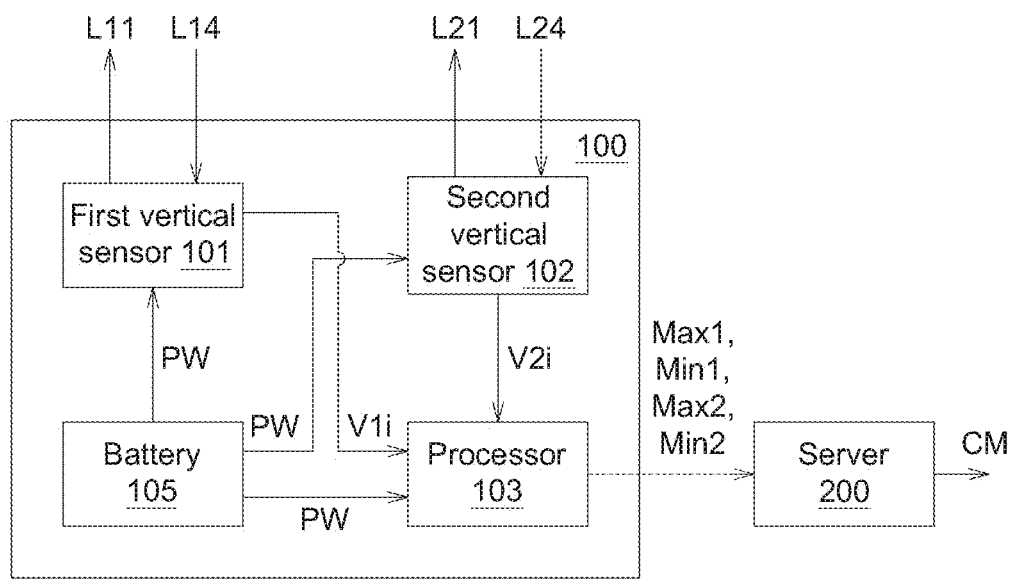
FIG. 3 shows a block diagram of the smart cassette according to an embodiment of the present disclosure.
Figure 4:
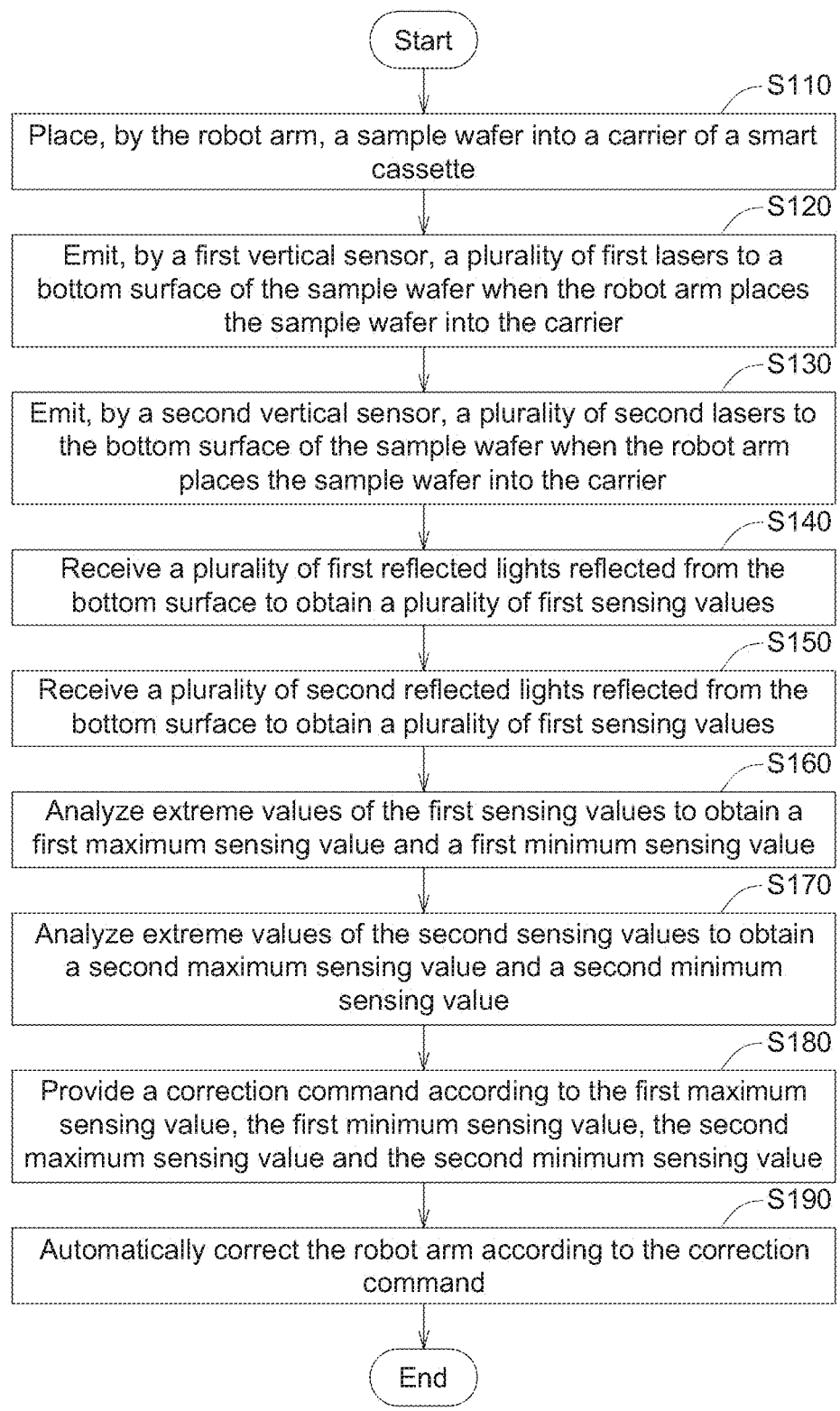
FIG. 4 shows a flow chart of a calibration method for the robot arm according to an embodiment of the present disclosure.

The following explains the calibration method for the robot arm 300 in detail through a flow chart. Please refer to FIGS. 1 to 4. FIG. 3 shows a block diagram of a smart cassette according to an embodiment of the present disclosure, and FIG. 4 shows a flow chart of the calibration method for the robot arm according to an embodiment of the present disclosure. In this embodiment, the calibration method for the robot arm 300 includes step S110 to step S190. In the step S110, the robot arm 300 places the sample wafer 400 into the carrier 109 of the smart cassette 100.

Then, in the step S120, as shown in the FIG. 2, when the robot arm 300 places the sample wafer 400 into the carrier 109, the first vertical sensor 101 emits the first lasers L11 to the bottom surface 400b of the sample wafer 400. When the sample wafer 400 is placed into the carrier 109, the first lasers L11 are emitted intermittently or continuously, for example.

Then, in the step S130, as shown in FIG. 2, when the robot arm 300 places the sample wafer 400 into the carrier 109, the second vertical sensor 102 emits the second lasers L21 to the bottom surface 400b of the sample wafer 400. When the sample wafer 400 is placed into the carrier 109, the second lasers L21 are emitted intermittently or continuously, for example. The first lasers L11 of the first vertical sensor 101 and the second lasers L21 of the second vertical sensor 102 are emitted periodically and synchronously.

Next, in the step S140, as shown in FIG. 2, the first vertical sensor 101 receives the first reflected lights L14 reflected from the bottom surface 400b of the sample wafer 400 to obtain a plurality of first sensing values V1$i$. For example, based on the difference between the emission time of each of the first lasers L11 and the reception time of the corresponding first reflected lights L14, the distance between the bottom surface 400b of the sample wafer 400 and the first vertical sensor 101 can be determined. The first sensing values V1$i$, for example, record these distance values.

Then, in the step S150, as shown in FIG. 2, the second vertical sensor 102 receives the second reflected lights L24 reflected from the bottom surface 400b of the sample wafer 400 to obtain a plurality of second sensing values V2$i$. For example, based on the difference between the emission time of each of the second lasers L21 and the reception time of the corresponding second reflected lights L24, the distance between the bottom surface 400b of the sample wafer 400 and the second vertical sensor 102 can be determined. The second sensing value V2$i$, for example, record these distance values.

The first vertical sensor 101 and the second vertical sensor 102 receive the first reflected lights L14 and the second reflected lights L24 periodically and simultaneously.

Then, in the step S160, as shown in FIG. 3, after the processor 103 obtains the first sensing values V1$i$ and the second sensing values V2$i$, the extreme values of the first sensing values V1$i$ are analyzed to obtain a first maximum sensing value Max1 and a first minimum sensing value Min1.

In the step S170, as shown in FIG. 3, the processor 103 analyzes the extreme values of the second sensing values V2$i$ to obtain a second maximum sensing value Max2 and a second minimum sensing value Min2.

Then, in the step S180, as shown in FIG. 3, the processor 103 sends the first maximum sensing value Max1, the first minimum sensing value Min1, the second maximum sensing value Max2 and the second minimum sensing value Min2 to a server 200 to provide a correction command CM.

Next, in the step S190, as shown in FIG. 4, the server 200 sends the correction command CM to the robot arm 300, and the robot arm 300 is automatically corrected according to the received correction command CM.

In this embodiment, whether the robot arm 300 is offset can be determined according to the position of the bottom surface 400b of the sample wafer 400 during the process of placing the sample wafer 400 into the smart cassette 100, and then the robot arm 300 can be adjusted in a timely manner to avoid scratching or cracking the wafer when inserting it.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed. It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A smart cassette, comprising:
   a carrier;
   a first vertical sensor, disposed on a first inner side of the carrier, wherein when a robot arm places a sample wafer into the carrier, the first vertical sensor emits a plurality of first lasers to a bottom surface of the sample wafer, and receives a plurality of first reflected lights reflected from the bottom surface to obtain a plurality of first sensing values;
   a second vertical sensor, disposed on a second inner side of the carrier, wherein when the robot arm places the sample wafer into the carrier, the second vertical sensor emits a plurality of second lasers to the bottom surface of the sample wafer, and receives a plurality of second reflected lights reflected from the bottom surface to obtain a plurality of second sensing values;
   a battery, connected to the first vertical sensor and the second vertical sensor, for providing a power to the first vertical sensor and the second vertical sensor; and
   a processor, connected to the first vertical sensor and the second vertical sensor, wherein after obtaining the first sensing values and the second sensing values, the processor analyzes extreme values of the first sensing values to obtain a first maximum sensing value and a first minimum sensing value, and analyzes extreme values of the second sensing values to obtain a second maximum sensing value and a second minimum sensing value;
   wherein the first maximum sensing value, the first minimum sensing value, the second maximum sensing value and the second minimum sensing value are sent to a server to provide a correction command.

2. The smart cassette according to claim 1, wherein the first lasers and the second lasers are emitted periodically and synchronously.

3. The smart cassette according to claim 1, wherein the first reflected lights and the second reflected lights are received periodically and synchronously.

4. The smart cassette according to claim 1, wherein an emission direction of the first lasers is substantially perpendicular to a horizontal plane, and an emission direction of the second lasers is substantially perpendicular to the horizontal plane.

5. The smart cassette according to claim 1, wherein the first vertical sensor and the second vertical sensor are substantially located at identical height.

6. The smart cassette according to claim 1, wherein a distance between the first vertical sensor and a center of the carrier is substantially equal to a distance between the second vertical sensor and the center of the carrier.

7. A calibration method for a robot arm, comprising:
   placing, by the robot arm, a sample wafer into a carrier of a smart cassette;
   emitting, by a first vertical sensor, a plurality of first lasers to a bottom surface of the sample wafer when the robot arm places the sample wafer into the carrier;
   emitting, by a second vertical sensor, a plurality of second lasers to the bottom surface of the sample wafer when the robot arm places the sample wafer into the carrier;
   receiving a plurality of first reflected lights reflected from the bottom surface to obtain a plurality of first sensing values;
   receiving a plurality of second reflected lights reflected from the bottom surface to obtain a plurality of first sensing values;
   analyzing extreme values of the first sensing values to obtain a first maximum sensing value and a first minimum sensing value;
   analyzing extreme values of the second sensing values to obtain a second maximum sensing value and a second minimum sensing value; and
   providing a correction command according to the first maximum sensing value, the first minimum sensing value, the second maximum sensing value and the second minimum sensing value.

8. The calibration method for the robot arm according to claim 7, wherein the first lasers and the second lasers are emitted periodically and synchronously.

9. The calibration method for the robot arm according to claim 7, the first reflected lights and the second reflected lights are received periodically and synchronously.

10. The calibration method for the robot arm according to claim 7, wherein an emission direction of the first lasers is substantially perpendicular to a horizontal plane, and an emission direction of the second lasers is substantially perpendicular to the horizontal plane.

11. The calibration method for the robot arm according to claim 7, wherein the first vertical sensor and the second vertical sensor are substantially located at identical height.

12. The calibration method for the robot arm according to claim 7, wherein a distance between the first vertical sensor and a center of the carrier is substantially equal to a distance between the second vertical sensor and the center of the carrier.

13. The calibration method for the robot arm according to claim 7, further comprising:
   automatically correcting the robot arm according to the correction command.

* * * * *